April 29, 1924.
W. F. SUTHERST
MANUFACTURE OF SULPHUR
Filed July 16, 1920
1,492,489
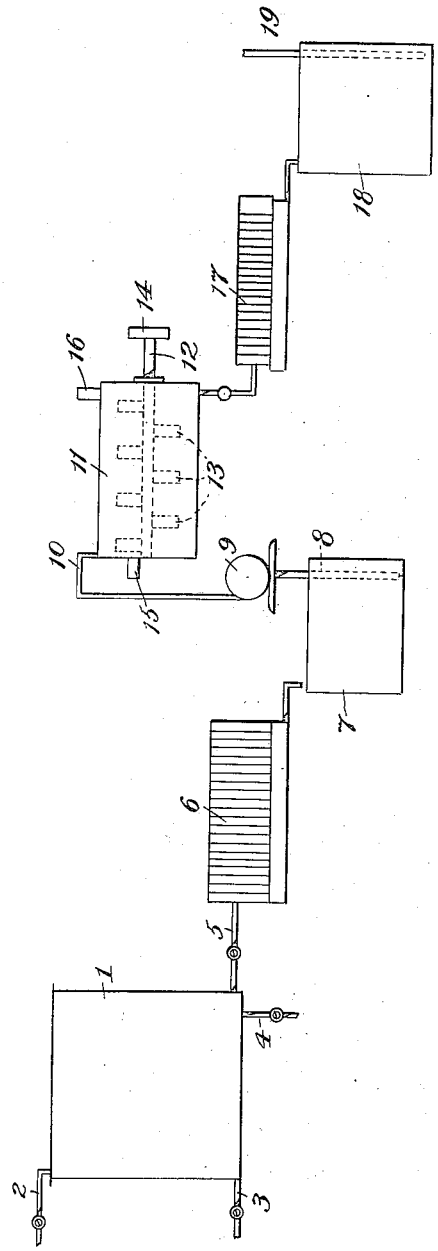

Patented Apr. 29, 1924.

1,492,489

UNITED STATES PATENT OFFICE.

WALTER FREDERICK SUTHERST, OF BERKELEY, CALIFORNIA, ASSIGNOR, BY MESNE ASSIGNMENTS, TO HERBERT & HERBERT, INC., OF PERTH AMBOY, NEW JERSEY, A CORPORATION OF NEW JERSEY.

MANUFACTURE OF SULPHUR.

Application filed July 16, 1920. Serial No. 396,793.

*To all whom it may concern:*

Be it known that I, WALTER F. SUTHERST, a subject of the King of Great Britain, residing at Berkeley, in the county of Alameda and State of California, have invented certain new and useful Improvements in the Manufacture of Sulphur, of which the following is a specification, reference being had therein to the accompanying drawing.

My invention relates to new and useful improvements in the manufacture of sulphur and has for its principal object to make a precipitated sulphur ostensibly of a finely divided or colloidal nature together with valuable by-products.

In a pending application, executed of even date herewith, I described a process for the manufacture of sodium thiosulfate, whereby a liquor is obtained containing sodium polysulfides and sodium thiosulfate, according to the following reaction:—

(1) 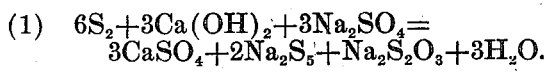
$$6S_2 + 3Ca(OH)_2 + 3Na_2SO_4 = 3CaSO_4 + 2Na_2S_5 + Na_2S_2O_3 + 3H_2O.$$

The filtrate from this reaction contains in solution sodium polysulfides and sodium thiosulfate, and I now reduce the same with sulfurous acid gas, sulphur dioxide, according to the following equation:

(2) 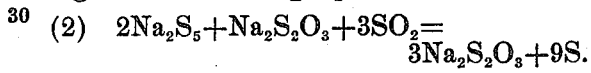
$$2Na_2S_5 + Na_2S_2O_3 + 3SO_2 = 3Na_2S_2O_3 + 9S.$$

Any of the corresponding other alkali-metal or alkaline earth metal salts and compounds, denoted above, could be used, but for obvious reasons the sodium salts are used, further any solutions or mixture containing alkaline metal sulfides and alkaline earth metal sulfides together with or without any other compounds can be used, and I wish it to be understood that this process is applicable in all such cases, yet this process was worked out more particularly to carry out the reaction described by equation (2).

The reaction of equation (2), if carried on, as will now be described, is practically speaking theoretical and no hydrogen sulfide, which might form and escape into the air, is noticeable, as an excess of sulphur dioxide is present at all times.

The filtrate from equation (1) is either sprayed, atomized, or by some other convenient method made to fill the air space of a cylindrical or rectangular vessel, preferably in a horizontal position, but the same object can be accomplished should the vessel be in any other position. By this method the sodium sulfide solution is divided into fine particles, and when in this condition sulphur dioxide is passed through, which immediately reduces the sodium sulfide, precipitating sulphur and forming sodium thiosulfate.

The sprayed and reacted solution which is allowed to collect in the bottom of the vessel or in some other convenient apparatus, is then filtered, and washed. The precipitate is a sulphur paste and can be used in commerce as such or can be dried for medical and other industrial purposes, in this latter case the sulphur obtained is superior to such imported products known as precipitated or lac sulphur.

The filtrate containing sodium thiosulfate is evaporated in a vacuum evaporator to a point where it can be crystallized as a solid mass, and the adherent moisture can be centrifuged off. Necessary and known precautions must be taken to prevent oxidation in working the finished sodium thiosulfate.

The formed precipitated sulphur is extremely fine and must be prevented from agglomerating, which I accomplish by cooling the sulphur dioxide gas and also if necessary the solution containing the sodium sulfide. By this means a colloidal sulphur is obtained, which can be considered as sulphur in an extremely fine form. It will be understood that the solution containing the finely divided sulfides will be reduced at low temperature.

The advantages of such a sulphur must be apparent to anyone acquainted with the uses of sulphur, especially in agriculture, where it is used in spraying machines, and the sulphur ordinarily used clogs the orifices of the sprayer. A method of demonstrating the colloidal nature of sulphur prepared by this method consists in suspending the same in water. Whilst any ground, sublimed or ordinary precipitated sulphur settles out very quickly, the colloidal sulphur remains suspended for hours, in fact settles out very slowly, and if an organic gum, colloidal agent, or any such product having similar physical properties, is mixed with the sulphur it will remain suspended for days.

The value of sodium thiosulfate as a commercial commodity is well known. It is indispensable in photography as a fixing medium, is used extensively in the tanning, textile and paper industry, as well as pharmacy.

One method of carrying out my process is indicated in the attached drawings in which I have shown a diagrammatic view.

1 is a vessel for boiling together lime, crude sulphur and salt cake, the numeral 2 being the water supply pipe. The boiling is achieved by passing live steam at 3, into a coil of pipe in the bottom of vessel 1, whilst 4 takes care of the steam drips, being the steam outlet. When all the sulphur in tank 1 has been dissolved the contents are passed through pipe 5, into the filter press 6, where the calcium sulfate sludge is held and washed, whilst the filtrate containing the sodium thiosulfate and sodium polysulfides is collected in vessel 7.

Vessel 7 is supplied with a suction pipe 8 attached to pump 9, which takes the liquor collected in vessel 7 and transports it through pipe 10 to the reducing vessel 11. Reducing vessel 11 is provided with a shaft 12, fitted with beaters or arms 13, which rotate with the shaft, being driven by pulley 14. The purpose of these beaters is to create a spray of the liquid containing the sodium polysulfides. The atmosphere above the liquid in vessel 11 is sulfurous acid gas, which enters at 15, vessel 11 is connected to a flue by a pipe 16.

After the reaction in vessel 11 is complete the mass is run into filter press 17, which holds the precipitated sulphur, which is washed out, whilst the filtrate containing the sodium thiosulfate is collected in vessel 18. Vessel 18 is supplied with a suction pipe 19 for carrying this filtrate to vacuum or other evaporators to concentrate the liquor for crystallization of the sodium thiosulfate which is a well known process.

What I claim is:—

1. A process for the manufacture of sulphur which consists in reducing solutions containing alkaline sulfides, in finely divided state, at low temperatures, with sulphur dioxide.

2. A process for the manufacture of sulphur which consists in reducing solutions of sodium thiosulfate containing sodium polysulfides by sulphur dioxide, substantially as described.

3. A process for the manufacture of sulphur which consists in reducing a solution of sodium thiosulfate containing sodium polysulfides, in finely divided form, substantially as described.

4. A process for the manufacture of sulphur which consists in reducing a solution of sodium thiosulfate containing sodium polysulfides, in finely divided form and at low temperature, by sulphur dioxide substantially as described.

5. A process for the manufacture of sulphur which consists in reducing sodium sulfides by sulphur dioxide and forming sodium thiosulfate as a by-product, substantially as described.

6. A process for the manufacture of sulphur which consists in reducing sodium sulfides in solution by sulphur dioxide and forming sodium thiosulfate as a by-product, substantially as described.

7. A process for the manufacture of sulphur which consists in reducing sodium sulfides in solution, in a finely divided state at low temperature, by sulphur dioxide, substantially as described.

In testimony whereof I hereunto affix my signature in the presence of two witnesses.

WALTER FREDERICK SUTHERST.

Witnesses:
 Mrs. S. W. KNOWLES,
 ISABEL F. LONGBOURNE.